United States Patent
Calpe Maravilla et al.

(10) Patent No.: US 12,165,343 B2
(45) Date of Patent: Dec. 10, 2024

(54) ENHANCING DEPTH ESTIMATION WITH BRIGHTNESS IMAGE

(71) Applicant: Analog Devices International Unlimited Company, Limerick (IE)

(72) Inventors: Javier Calpe Maravilla, Valencia (ES); Jonathan Ephraim David Hurwitz, Edinburgh (GB); Nicolas Le Dortz, Palo Alto, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/067,569

(22) Filed: Dec. 16, 2022

(65) Prior Publication Data
US 2023/0258810 A1 Aug. 17, 2023

Related U.S. Application Data

(60) Provisional application No. 63/310,859, filed on Feb. 16, 2022.

(51) Int. Cl.
*G01S 17/894* (2020.01)
*G01S 7/4915* (2020.01)
(Continued)

(52) U.S. Cl.
CPC .............. *G06T 7/55* (2017.01); *G01S 7/4915* (2013.01); *G01S 17/36* (2013.01); *G01S 17/894* (2020.01);
(Continued)

(58) Field of Classification Search
CPC ...... H04N 23/74; H04N 23/56; H04N 25/705; H04N 25/78; H04N 23/11; G01S 17/894;
(Continued)

(56) References Cited

U.S. PATENT DOCUMENTS 9,167,230 B2 * 10/2015 Min ..................... H04N 13/207
10,091,491 B2 * 10/2018 Choi .................... H04N 13/254
(Continued)

OTHER PUBLICATIONS

Ferstl et al., "Image Guided Depth Upsampling Using Anisotropic Total Generalized Variation," Proceedings of the IEEE International Conference on Computer Vision (ICCV), IEEE, Dec. 1, 2013, pp. 993-1000.

(Continued)

*Primary Examiner* — Trang U Tran
(74) *Attorney, Agent, or Firm* — ARENTFOX SCHIFF LLP

(57) ABSTRACT

A depth estimation system can enhance depth estimation using brightness image. Light is projected onto an object. The object reflects at least a portion of the projected light. The reflected light is at least partially captured by an image sensor, which generates image data. The depth estimation system may use the image data to generate both a depth image and a brightness image. The image sensor includes a plurality of pixels, each of which is associated with two ADCs. The ADCs receive different analog signals from the pixel and outputs different digital signals. The depth estimation system may use the different digital signals to determine the brightness value of a brightness pixel of the brightness image. The ADCs may be associated with one or more other pixels. The pixel and the one or more other pixels may be arranged in a same column in an array of the image sensor.

20 Claims, 12 Drawing Sheets

(51) Int. Cl.
| | |
|---|---|
| *G01S 17/36* | (2006.01) |
| *G06T 5/00* | (2006.01) |
| *G06T 5/20* | (2006.01) |
| *G06T 5/50* | (2006.01) |
| *G06T 7/13* | (2017.01) |
| *G06T 7/521* | (2017.01) |
| *G06T 7/55* | (2017.01) |
| *H04N 23/11* | (2023.01) |
| *H04N 23/56* | (2023.01) |
| *H04N 23/74* | (2023.01) |
| *H04N 25/705* | (2023.01) |
| *H04N 25/78* | (2023.01) |

(52) U.S. Cl.
CPC ............... *G06T 5/00* (2013.01); *G06T 5/20* (2013.01); *G06T 5/50* (2013.01); *G06T 7/13* (2017.01); *G06T 7/521* (2017.01); *H04N 23/11* (2023.01); *H04N 23/56* (2023.01); *H04N 23/74* (2023.01); *H04N 25/705* (2023.01); *H04N 25/78* (2023.01); *G06T 2207/10028* (2013.01); *G06T 2207/10048* (2013.01); *G06T 2207/20192* (2013.01); *G06T 2207/20221* (2013.01)

(58) Field of Classification Search
CPC ...... G01S 7/4915; G01S 17/36; G01S 7/4861; G01S 7/487; G06T 7/55; G06T 7/521; G06T 7/13; G06T 5/00; G06T 5/20; G06T 5/50; G06T 2207/10028; G06T 2207/10048; G06T 2207/20192; G06T 2207/20221
USPC ........................................................ 348/135
See application file for complete search history.

(56) References Cited

U.S. PATENT DOCUMENTS

| | | | | |
|---|---|---|---|---|
| 10,132,616 | B2* | 11/2018 | Wang | G01B 11/22 |
| 10,535,151 | B2* | 1/2020 | Bleyer | G06T 7/11 |
| 10,931,905 | B2* | 2/2021 | Jin | G01S 17/89 |
| 11,204,415 | B2* | 12/2021 | Jin | H01L 27/14625 |
| 11,734,801 | B2* | 8/2023 | Ortiz Egea | G06T 7/80 |
| | | | | 382/106 |
| 2011/0285910 | A1 | 11/2011 | Bamji et al. | |
| 2013/0176426 | A1* | 7/2013 | Ovsiannikov | H04N 25/705 |
| | | | | 348/135 |
| 2017/0018114 | A1 | 1/2017 | Stewart et al. | |
| 2018/0343438 | A1 | 11/2018 | Cho et al. | |
| 2019/0197735 | A1 | 6/2019 | Xiong et al. | |
| 2021/0356598 | A1 | 11/2021 | Hurwitz | |

OTHER PUBLICATIONS

Hui et al., "Depth Map Super-Resolution by Deep Multi-Scale Guidance," 16th European Conference—Computer Vision, Sep. 17, 2016, pp. 353-369.
International Search Report and Written Opinion in PCT/EP2023/053961, dated May 15, 2023, 21 pages.
International Search Report and Written Opinion in PCT/EP2023/053974, dated May 15, 2023, 19 pages.
International Search Report and Written Opinion in PCT/EP2023/053978, dated May 15, 2023, 20 pages.
Jung et al., "Intensity-guided edge-preserving depth upsampling through weighted L0 gradient minimization," Journal of Visual Communication and Image Representation, Nov. 17, 2016, vol. 42, pp. 132-144.
Li et al., "Guided Depth Map Super-Resolution Using Recumbent Y Network," IEEE Access, IEEE, Jul. 7, 2020, vol. 8, pp. 122695-122708.
Or-El et al., "RGBD-fusion: Real-time high precision depth recovery," 2015 IEEE Conference on Computer Vision and Pattern Recognition (CVPR), IEEE, Jun. 7, 2015, pp. 5407-5416.
Park et al., "High quality depth map upsampling for 3D-TOF cameras," 2011 IEEE International Conference on Computer Vision (ICCV), Nov. 6, 2011, pp. 1623-1630.
Chen et al., Depth image enhancement for kinect using region growing and bilateral filter, in Proceedings of the 21st International Conference on Pattern Recognition (ICPR2012). IEEE, 2012, pp. 3070-3073.
Evangelidis et al., Fusion of range and stereo data for high-resolution scene-modeling, IEEE transactions on pattern analysis and machine intelligence, 2015, vol. 37, No. 11, pp. 2178-2192.
Gu et al., Learning dynamic guidance for depth image enhancement, in Proceedings of the IEEE conference on computer vision and pattern recognition, 2017, pp. 3769-3778.
Izadi et al., Kinectfusion: real-time 3d reconstruction and interaction using a moving depth camera, in Proceedings of the 24th annual ACM symposium on User interface software and technology, 2011, pp. 559-568.
Jeon et al., Reconstruction-based pairwise depth dataset for depth image enhancement using cnn, in Proceedings of the European Conference on Computer Vision (ECCV), 2018, pp. 422-438.
Kim et al., Spatial and temporal enhancement of depth images captured by a time-of-flight depth sensor, in 2010 20th International Conference on Pattern Recognition. IEEE, 2010, pp. 2358-2361.
Mutto et al., Locally consistent tof and stereo data fusion, in European Conference on Computer Vision. Springer, 2012, pp. 598-607.
Russakoff et al., Image similarity using mutual information of regions, in European Conference on Computer Vision. Springer, 2004, pp. 596-607.
Schwarz et al., A weighted optimization approach to time-of-flight sensor fusion, IEEE Transactions on Image Processing, 2013, vol. 23, No. 1, pp. 214-225.
Schwarz et al., Improved edge detection for ewoc depth upscaling, in 2012 19th International Conference on Systems, Signals and Image Processing (IWSSIP). IEEE, 2012, pp. 1-4.
Schwarz et al., Time-of-flight sensor fusion with depth measurement reliability weighting, in 2014 3DTV-Conference: The True Vision-Capture, Transmission and Display of 3D Video (3DTV-CON). IEEE, 2014, pp. 1-4.
Sublime et al., Un algorithme ICM basé sur la compacité pour la segmentation des images satellites à très haute résolution, EGC, 2015, pp. 191-196.
Zakeri et al., Guided optimization framework for the fusion of time-of-flight with stereo depth, Journal of Electronic Imaging, 2020, vol. 29, No. 5, pp. 053016.
Zhang, Image restoration: flexible neighborhood systems and iterated conditional expectations, Statistica Sinica, 1993, pp. 117-139.
Zhu et al., Reliability fusion of time-of-flight depth and stereo geometry for high quality depth maps, IEEE transactions on pattern analysis and machine intelligence, 2010, vol. 33, No. 7, pp. 1400-1414.
Zivkovic et al., Gentle icm energy minimization for markov random fields with smoothness-based priors, Journal of Real-Time Image Processing, 2016, vol. 11, No. 1, pp. 235-246.

\* cited by examiner

1200

Generate, based on image data from an image sensor comprising a plurality of pixels, a brightness image comprising a plurality of brightness pixels, wherein each of the plurality of brightness pixels corresponds to a respective pixel of the plurality of pixels and is generated based on signals from two ADCs associated with the respective pixel
1210

↓

Generate, based on the image data, a depth image comprising a plurality of depth pixels, each depth pixel associated with a depth value
1220

↓

Determine a new depth value for a target depth pixel of the plurality of depth pixels based on a brightness pixel of the plurality of brightness pixels
1230

↓

Update the depth image by assigning the new depth value to the target depth pixel
1240

FIG. 12

ENHANCING DEPTH ESTIMATION WITH BRIGHTNESS IMAGE

CROSS REFERENCE TO RELATED APPLICATION

This application claims the benefit of U.S. Provisional Patent Application No. 63/310,859, filed Feb. 16, 2022, which is incorporated by reference in its entirety.

TECHNICAL FIELD OF THE DISCLOSURE

The present disclosure relates generally to depth estimation and, more specifically, to enhancing depth estimation with brightness images.

BACKGROUND

One technique to measure depth is to directly or indirectly calculate the time it takes for a signal to travel from a signal source on a sensor to a reflective surface and back to the sensor. The time travelled is proportional to the distance from the sensor to the reflective surface. This travel time is commonly referred as time of flight (ToF). Various types of signals can be used with ToF sensors, the most common being sound and light. Some sensors use light as their carrier given the advantages of light with respect to speed, range, power, and low weight.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 12 is a flowchart showing a method of enhancing depth estimation with a brightness image, according to some embodiments of the present disclosure.

DESCRIPTION OF EXAMPLE EMBODIMENTS OF THE DISCLOSURE

Overview

Figure 1:
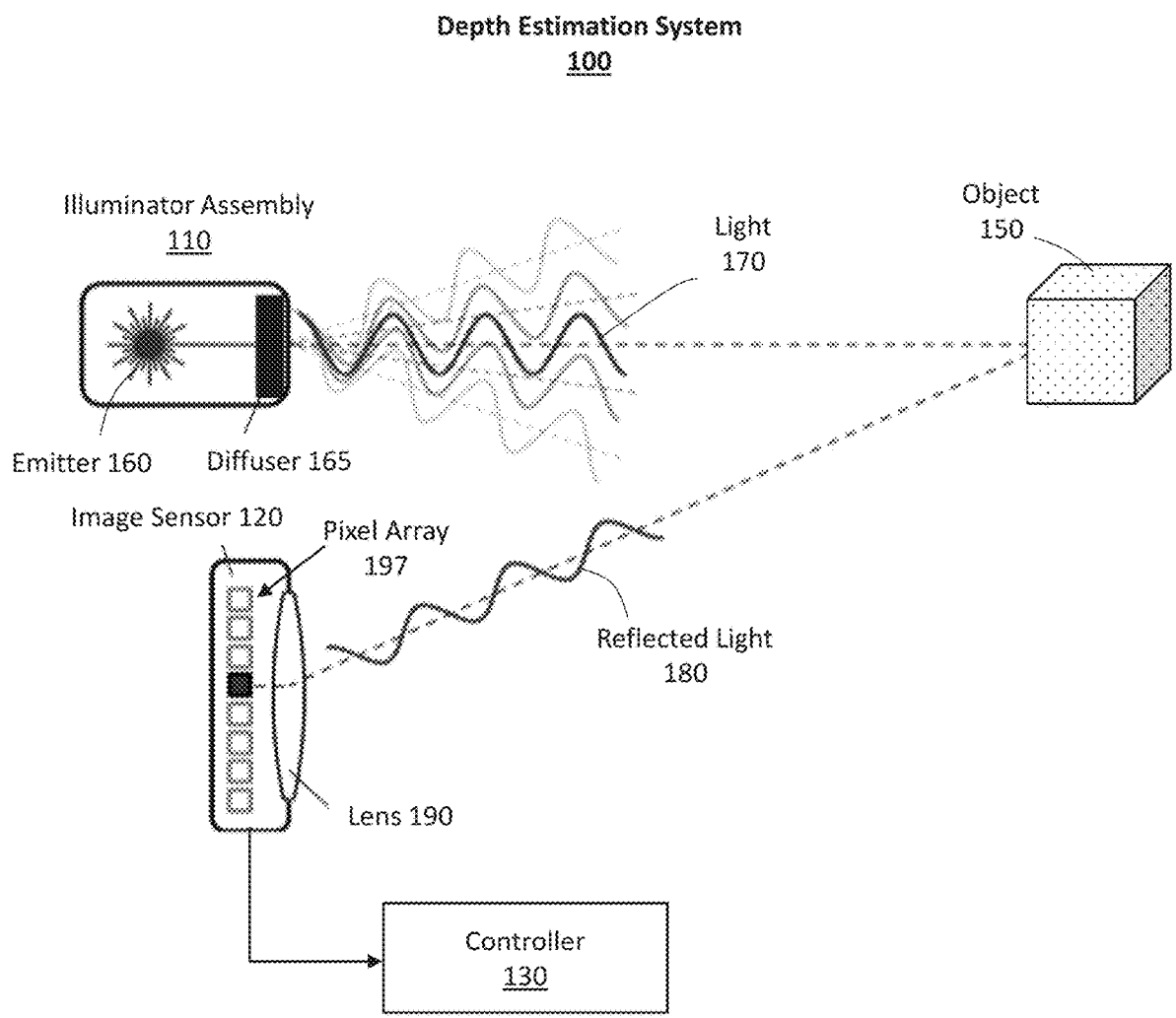
FIG. 1 illustrates a depth estimation system according to some embodiments of the present disclosure.

Depth estimation is a fundamental task in three-dimensional (3D) computer vision. High quality and dense depth images resulting from ToF camera systems play a fundamental role in many applications, such as robotics, human-computer interaction, indoor navigation, self-driving cars, object tracking, and gesture recognition. ToF camera systems are range imaging systems. A ToF camera system typically includes a light source that projects light and an imaging sensor that receives reflected light. The ToF camera system can estimate the distance between the imaging sensor and an object by measuring the round trip of the light. A continuous-wave ToF camera system can project multiple periods of a continuous light wave and determine the distance based on the phase difference between the projected light and the received reflected light. A depth image can be generated based on the phase difference.

However, ToF depth maps are often captured with low resolution, different types of noise or missing values. ToF camera systems often fails to accurately estimate depth of boundaries, such as edges of objects, reflectivity boundaries (e.g., a boundary between two areas that have different reflectivity properties), and so on. The inaccurate depth estimation may limit usage of ToF camera systems in the applications mentioned above. Therefore, improved technology for depth estimation is needed.

Embodiments of the present disclosure relates to a depth estimation system that can enhance ToF depth estimation using brightness images. A brightness image may be an active brightness image, such as an infrared (IR) image, or a RGB (red, green, and blue) image. The depth estimation system may simultaneously acquire the brightness image and the ToF depth estimation. The brightness image and the ToF depth estimation may be based on same light source (e.g., IR) or different light sources (e.g., visible light for the brightness image versus IR for the ToF depth estimation). Brightness images may have better detection of boundaries and can be used to enhance depth images generated by ToF camera systems.

An example of the depth estimation system includes an illuminator assembly, an image sensor, and a controller. The illuminator assembly can project light to illuminate a local area, such as an area that includes an object. The light may be modulated light, such as modulated IR. The illuminator assembly may project pulsed light. Alternatively, the illuminator assembly may project one or more continued waves, such as continued waves of different frequencies. The object can reflect at least a portion of the projected light. The image sensor captures at least a portion of the reflected light and generates image data. The image sensor may include a pixel array and a plurality of analog-to-digital converters (ADCs). The pixel array may convert photons to electrical charges, which constitute analog signals. The ADCs can convert analog signals to digital signals. Each pixel may be associated with two ADCs, each of which receives a different analog signal from the pixel and generates a different digital signal. In some embodiments, the pixel array includes columns of pixels. Each column may be associated with two ADCs.

The controller receives the digital signals generated by the ADCs and can generate a depth image and a corresponding brightness image from the digital signals. In some embodiments, the depth image is based on a phase shift between the captured light and the projected light, and the brightness image based on brightness of the captured light. The depth image may include a plurality of depth pixels, each of which may correspond to a pixel in the brightness image. The controller uses the brightness image to enhance the depth image. The controller may perform the enhancement process on a pixel level. For instance, the controller may identify a target depth pixel in the depth image and change the depth value of the target depth pixel based on one or more brightness pixels in the brightness image. The controller may change depth values of part or all of the depth pixels in the depth image and generate a new depth image.

The depth estimation system in the present disclosure can take advantage of brightness images showing cleaner boundaries to enhance depth estimation of boundaries and can also smooth flat planes. Enhanced depth images generated by the depth estimation system can show the boundaries better than regular ToF depth images. With the more accurate depth estimation, the enhanced depth images can be used in various applications.

Example Depth Estimation System

FIG. 1 illustrates a depth estimation system 100 according to some embodiments of the present disclosure. The depth estimation system 100 may use ToF techniques to generate depth images. The depth estimation system 100 includes an illuminator assembly 110, an image sensor 120, and a controller 130. The illuminator assembly 110 includes an emitter 160 and a diffuser 165. In alternative configurations, different and/or additional components may be included in the depth estimation system 100. Further, functionality attributed to one component of the depth estimation system 100 may be accomplished by a different component included in depth estimation system 100 or a different system than those illustrated. For example, the illuminator assembly 110 may include no diffuser or more than one diffuser. As another example, the image sensor 120 may include no lens or more than one lens.

The illuminator assembly 110 projects light 170 to a local area that includes an object 140. The emitter 160 is a light source that emits light ("emitted light"). In some embodiments, the emitter 160 may include a laser, such as an IR or near-IR (NIR) laser, an edge emitting laser, vertical-cavity surface-emitting laser (VCSEL), and so on. In other embodiments, the emitter 160 may include one or more light-emitting diodes (LEDs). The emitter 160 can emit light in the visible band (i.e., ~380 nm to 750 nm), in the NIR band (i.e., ~750 nm to 1 mm), in the ultraviolet band (i.e., 10 nm to 380 nm), in the shortwave IR (SWIR) band (e.g., ~900 nm to 2200 nm), some other portion of the electromagnetic spectrum, or some combination thereof. In some embodiments, the illuminator assembly 110 may include multiple emitters 160, each of which may emit a different wavelength. For instance, the illuminator assembly 110 may include a first emitter that emits IR and a second emitter that emits visible light. The diffuser 165 spreads out or scatters the emitted light before the light 170 is projected into the local area. The diffuser 165 may also control brightness of the emitted light. In some embodiments, the diffuser 165 may be translucent or semi-transparent. In other embodiments, the illuminator assembly 110 may include more, fewer, or different components. For instance, the illuminator assembly 110 may include one or more additional diffusers to direct light from the emitter 160 to one or more additional objects in the local area.

The illuminator assembly 110 may project the light 170 as modulated light, e.g., according to a periodic modulation waveform. An example of the periodic modulation waveform may be a sinusoidally modulated waveform. The frequency of the periodic modulation waveform is the frequency of the modulated light.

The illuminator assembly 110 may project one or more continuous waves. For an individual continuous wave, the illuminator assembly 110 may project multiple periods. Different continuous waves may have different wavelengths and frequencies. For instance, the illuminator assembly 110 can project continuous waves having modulation frequencies in a range from 50 MHz to 200 MHz. In an embodiment, the illuminator assembly 110 includes multiple (i.e., at least two) light projectors. The light projectors may project continuous waves having different frequencies. The light projectors may alternate and project the continuous waves at different times. For example, a first light projector projects a first continuous wave having a first frequency during a first time of period. After the first time of period, a second light projector projects a second continuous wave having a second frequency during a second time of period. After the second time of period, a third light projector projects a third continuous wave having a third frequency during a third time of period. The three continuous waves may constitute a cycle. This cycle can repeat.

In another embodiment, the illuminator assembly 110 may include one light projector that projects all the three continuous waves. In other embodiments, the illuminator assembly 110 may project a different number of continuous waves, such as two or more than three. One cycle may constitute one frame. The total time for a cycle may be 10-20 ms. The illuminator assembly 110 can project light through multiple cycles for obtaining multiple frames. There may be time gap between cycles. More information regarding modulated light having multiple frequencies is provided below in conjunction with FIG. 2.

At least a portion of the object 140 is illuminated by the light 170. For purpose of simplicity and illustration, the object 140 in FIG. 1 has a shape of a cube. In other embodiments, the object 140 may have other shapes or structures. Even though not shown in FIG. 1, the local area may include other objects that can be illuminated by the light. The object reflects the light, reflected light 180, and the reflected light 180 can be captured by the image sensor 120.

The image sensor 120 captures light from at least a portion of the local area illuminated with the light 170. For instance, the image sensor 120 captures the reflected light 180 and generates image data based on the reflected light 180. The reflected light 180 may be IR. In some embodiments, the image sensor 120 may also capture visible light reflected by the object 140. The visible light may be projected by the illuminator assembly 110, ambient light, or a combination of both. Even though the image sensor 120 is separated from the illuminator assembly 110 in FIG. 1, in some embodiments, the image sensor 120 is co-located with the illuminator assembly 110 (e.g., may be part of the same device). An embodiment of the image sensor 120 is the image sensor 400 in FIG. 4.

The image sensor 120 includes a lens 190 and a pixel array 195. The lens 190 receives the reflected light 180 and directs the reflected light 180 to the pixel array 195. The pixel array 195 includes a plurality of pixels 197. Even though the pixels 197 shown in FIG. 1 are arranged in a column, pixels 197 of the pixel array 195 may also arranged in multiple columns.

In some embodiments, a pixel includes a photodiode that is sensitive to light and converts collected photons to charges, e.g., photoelectrons. Each of the photodiodes has one or more storage regions that store the charges. The image sensor 120 may be both a ToF sensor and a brightness sensor. A pixel may be a depth-sensing pixel, a brightness-sensing pixel, or both. A depth-sensing pixel is configured to present a depth output signal that is dependent on the distance from the pixel array 195 to the locus of the object 140 imaged onto the depth-sensing pixel. Such distance is a 'depth' of the locus of the object 140. Each depth-sensing pixel may independently determine a distance to the object 140 viewed by that pixel. The depth output signals of the depth-sensing pixels in the pixel array 195 can be used to generate a depth image of the local area. A brightness-sensing pixel is configured to present a brightness output signal that is dependent on brightness of light reflected from the locus of the object 140 imaged onto the brightness-sensing pixel. The brightness output signals of the brightness-sensing pixels in the pixel array 195 can be used to generate a brightness image of the local area. The brightness image may be an active brightness image. An example of the brightness image is an IR image. In some embodiments, each pixel of the pixel array 195 may generate both a depth output signal and a brightness output signal from the reflected light that the pixel captures. In other embodiments, the pixel array 195 includes two sets of pixels 197: one set is for sensing depth and the other set is for sensing brightness. The output signals of the pixel array 195 may be analog signals, such as electrical charges.

In embodiments where the illuminator assembly 110 projects multiple continuous waves or multiple cycles of modulated light, the image sensor 120 can be synchronized with the projection of the illuminator assembly 110. For example, the image sensor 120 may have one or more exposure intervals, during which the image sensor 120 takes exposures of the portion of the local area and charges are accumulated in the pixel array 195. Outside the exposure interval, the image sensor 120 does not take exposures. In some embodiments, an exposure interval of the image sensor 120 may be synchronized with a continuous wave or cycle projected by the illuminator assembly 110. For instance, the exposure interval starts before or when the continuous wave or cycle starts and ends when or after the continuous wave or cycle ends. In other embodiments, the image sensor 120 may have multiple exposure intervals for a single continuous wave. For instance, the image sensor 120 may take multiple exposures during a continuous wave, and the multiple exposures may correspond to different phase offsets. In an example, there are three exposure intervals for one continuous wave at three different phase offsets, such as 0° (0), 120° (2π/3), and 240° (4π/3). There may be a time gap between the exposure intervals. The time gap maybe 1-2 milliseconds (ms). The exposure intervals may have a constant duration, e.g., approximately 100 microseconds (µs). In alternative embodiments, the exposure intervals may have different durations.

In some embodiments, the image sensor 120 may use global shutter scanning. The image sensor 120 includes a global shutter that may open and scan during each exposure interval and closes when the exposure interval ends. Additionally or alternatively, the image sensor 120 may include a tunable filter. The tunable filter blocks light from arriving at the detector and may be mounted anywhere in the optical path of the reflected light 180. For example, the tunable filter is attached on top of the pixel array 195 or at the front of the image sensor 120. The tunable filter can be switched between on (active) and off (inactive). The tunable filter can be inactive during an exposure interval and active when the exposure internal ends. When the tunable filter is inactive, light can pass the tunable filter and reach the pixel array 195. When the tunable filter is active, light is blocked from the pixel array 195.

In some embodiments, when the tunable filter is active, it may let light of a certain wavelength (or a certain band of wavelengths) pass but block light of other wavelengths. For instance, the tunable filter may let light of the wavelengths projected by the illuminator assembly 110 (e.g., the light 170) pass, but block light of other wavelengths, which can, for example, reduce noise in the image data captured by the image sensor 120. In an example where the light 170 is IR, the tunable filter may block visible light. In other embodiments, when the tunable filter is active, it can block light of all wavelengths to avoid charge accumulation in the pixel array 195. In embodiments where the tunable filter blocks all light, dark noise calibration of the pixel array 195 can be conducted.

The image sensor 120 may readout photoelectrons from the pixel array 195 to obtain image data. The photoelectrons may be analog signals stored in storage regions of each pixel of the pixel array 195. During the readout, the image sensor 120 can convert the analog signals into digital signals, e.g., through ADCs. The analog signals may be amplified, e.g., by amplifiers, before they are converted to the digital signals.

In embodiments where the illuminator assembly 110 includes multiple light projectors, photoelectrons corresponding to pulses of modulated light projected by different light projectors may be stored in separate storage regions of each photodiode. The image sensor 120 may read out the separate storage regions to obtain the image data. In some embodiments, the image sensor 120 may read out all the image data stored in the pixel array 195. In other embodiments, the image sensor 120 may read out some of the image data stored in the pixel array 195. For example, in embodiments where an exposure interval of the pixel array 195 is synchronized with a continuous wave projected by the illuminator assembly 110, the image sensor 120 may execute multiple readout intervals for the continuous wave. Each readout interval may correspond to a different phase offset. In an example, there are three readout intervals for one continuous wave at three different phase offsets, such as 0°, 120°, and 240°. There may be a time gap between the readout intervals. The time gap maybe 1-2 milliseconds (ms). The readout intervals may have a constant duration, e.g., approximately 100 microseconds (µs). In alternative embodiments, the readout intervals may have different durations.

The controller 130 controls the illuminator assembly 110 and the image sensor 120. For instance, the controller 130 provides illumination instructions to the illuminator assembly 110, and the illuminator assembly 110 projects the light 170 in accordance with the illumination instructions. The controller 130 can also provide imaging instructions to the image sensor 120, and the image sensor 120 takes exposures and reads out image data in accordance with the imaging instructions.

The controller 130 also determines depth information using image data from the image sensor 120. For instance, the controller 130 can generate depth images from the image data. A depth image includes a plurality of depth pixels. Each depth pixel has a value corresponding to an estimated depth, e.g., an estimated distance from a locus of the object 140 to the pixel array 195. A single depth image may also be referred to as a depth frame or a depth map. In embodiments where the illuminator assembly 110 projects a continuous wave of modulated light, the controller 130 may determine depth information based on the phase shift between the light 170 projected by the illuminator assembly 110 and the reflected light 180. In embodiments where the image sensor 120 reads out image data corresponding to different phase offsets of modulated light, the controller 130 may perform phase unwrapping to determine depth information. In some embodiments (e.g., embodiments where the illuminator assembly 110 projects multiple cycles of modulated light), the controller 130 may generate multiple depth frames.

The controller 130 can also generate a brightness image that corresponds to a depth image. The image data for the brightness image and the image data for the depth image may be generated by the image sensor 120 from same light, such as the reflected light 180. In some embodiments, the brightness image and the depth image are generated simultaneously. For instance, the image sensor 120 may simultaneously reads out the image data for the brightness image and the image data for the depth image. In an embodiment, the image data for the brightness image and the image data for the depth image are the same image data. The brightness image may include a plurality of brightness pixels. Each brightness pixel has a value corresponding to a light intensity, e.g., an IR intensity. A brightness pixel in the brightness image may correspond to a depth pixel in the depth image. The brightness pixel and the depth pixel may be generated from light reflected from the same locus of the object 140. For instance, the brightness pixel and the depth pixel may be generated based on signals from the same pixel of the pixel array 195, and the pixel captures the light reflected from the locus of the object 140.

The controller 130 can further enhance depth estimation in a depth image by fusing the depth image with a brightness image. The brightness image may show one or more cleaner boundaries of the object 140 than the depth image. For instance, one or more depth pixels that represent at least a portion of a boundary of the object 140 may be invalid. The boundary may be an edge of the object 140. Alternatively, the boundary is a boundary between two areas of the object 140 that have different reflectivity properties, such as a boundary between a fluorescent strip, which has relatively high reflectivity, and a low reflectivity surface. The controller 130 may take advantage of the more accurate information of the boundaries of the object 140 in the brightness image to generate an enhanced depth image, which includes better depth estimation than the original depth image. Certain aspects of the controller 130 are described below in conjunction with FIG. 6.

Example Modulated Signals

Figure 2A:
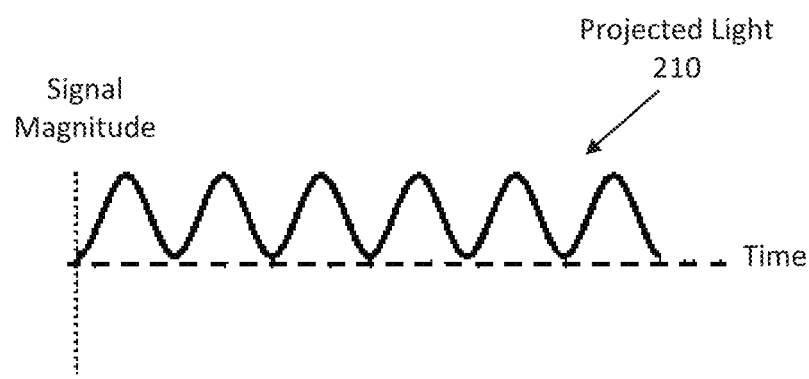
FIG. 2A illustrates a continuous wave of a projected signal according to some embodiments of the present disclosure.

FIG. 2A illustrates a continuous wave of a projected signal 210 according to some embodiments of the present disclosure. The projected signal 210 is a modulated signal, e.g., a modulated light projected by the illuminator assembly 110 in FIG. 1. The projected signal 210 has a sinusoidally modulated waveform. In the embodiments of FIG. 2A, the sinusoidally modulated waveform may be represented by the following equation:

$$S(t) = A_s \sin(2\pi f t) + B_s$$

Where t denotes time, S denotes optical power of projected signal, f is the frequency of the modulated signal (i.e., modulation frequency), π is the mathematical constant, $A_s$ denotes the amplitude of the modulated signal, $B_s$ denotes an offset of the modulated signal that may include attenuated original offset and/or an offset due to presence of ambient light (e.g., sunlight or light from artificial illuminants).

Figure 2B:
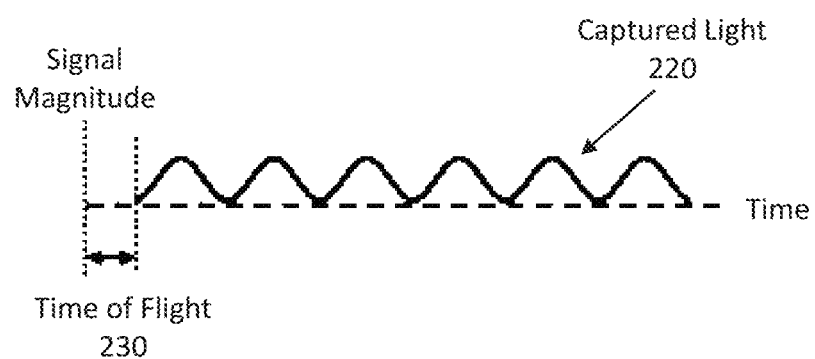
FIG. 2B illustrates a continuous wave of a captured signal according to some embodiments of the present disclosure.

FIG. 2B illustrates a continuous wave of a captured signal 220 according to some embodiments of the present disclosure. The captured signal 220 is a captured portion of modulated light reflected by an object illuminated by the projected signal 210. The captured signal 220 may be captured by the pixel array 195 and may be at least a portion of the reflected light 180 in FIG. 1. In the embodiments of FIG. 2A, the captured signal 220 can be represented by the following equation:

$$r(t) = \alpha(A_s \sin(2\pi f t + \varphi) + B_s)$$

$$\varphi = 2\pi f \delta$$

$$\delta = \frac{2d}{c}$$

where r denotes the optimal power of the captured signal 220, α denotes an attenuation factor of the captured signal 220, φ denotes a phase shift between the waveform of the captured signal 220 and the waveform of the projected signal 210, δ is time delay between the captured signal 220 and the projected signal 210, d denotes the distance from the pixel array 195 to the object 140 (i.e., the depth of the object 140), and c is the speed of light.

Figure 3:
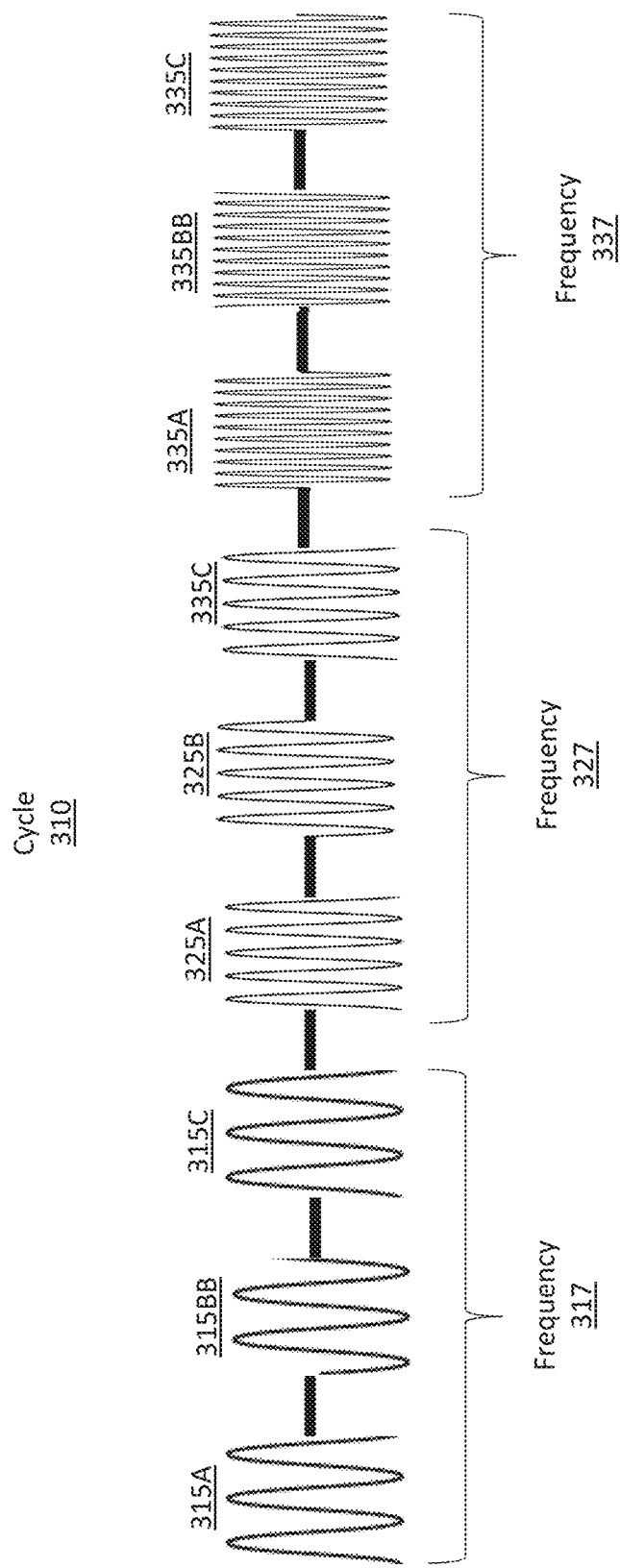
FIG. 3 illustrates a cycle of continuous waves of modulated light according to some embodiments of the present disclosure.

FIG. 3 illustrates a cycle 310 of continuous waves 315A-C, 325A-C, and 335A-C of modulated light according to some embodiments of the present disclosure. The continuous waves 315A-C, 325A-C, and 335A-C are sinusoidal waves in FIG. 3. In other embodiments, the continuous waves 315A-C, 325A-C, and 335A-C may have different waveforms. The continuous waves 315A-C has a frequency 317, the continuous waves 325A-C has a frequency 327, and the continuous waves 335A-C has a frequency 337. The three frequencies 317, 327, and 337 are different from each other. In the embodiments of FIG. 3, the frequency 317 is smaller than the frequency 327, and the frequency 327 is smaller than the frequency 337. The three frequencies 317, 327, and 337 may be in a range from 50 to 200 MHz or higher frequencies.

In an embodiment, the cycle 310 may be a cycle of projecting the modulated light by the illuminator assembly 110 in FIG. 1. In another embodiment, the cycle 310 may be a cycle of exposure by the image sensor 120. For instance, the image sensor 120 may take exposures during the periods of times of the continuous waves 315A-C, 325A-C, and 335A-C and not take exposures beyond these periods of times, despite that the illuminator assembly 110 may project modulated light beyond these periods of times. In yet another embodiment, the cycle 310 may be a cycle of readout by the image sensor 120. For instance, the image sensor 120 may read out charges accumulated in the pixel array 195 during the periods of times of the continuous waves 315A-C, 325A-C, and 335A-C and not read out charges beyond these periods of times, despite that the illuminator assembly 110 may project modulated light beyond these periods of times or that the pixel array 195 may take exposures beyond these periods of times. Even though the cycle 310 in FIG. 3 includes three continuous waves for each of the three frequencies, a cycle in other embodiments may include a different number of frequencies or a different number of continuous waves for each frequency.

In FIG. 3, the continuous waves 315A-C have different phase offsets. For instance, the continuous wave 315A has a phase offset of 0°, the continuous wave 315B has a phase offset of 120°, versus the continuous wave 315C has a phase offset of 240°. Similarly, the continuous waves 325A-C may have different phase offsets from each other: the continuous wave 325A may have a phase offset of 0°, the continuous wave 325B may have a phase offset of 120°, versus the continuous wave 325C may have a phase offset of 240°; and the continuous waves 335A-C may start at different phase offsets from each other: the continuous wave 335A may have a phase offset of 0°, the continuous wave 335B may have a phase offset of 120°, versus the continuous wave 335C may have a phase offset of 240°. The continuous waves 315A, 325A, and 335A may each have a phase between 0° and 120°, the continuous waves 315B, 325B, and 335B may each have a phase between 120° and 240°, and the continuous waves 315C, 325C, and 335C may each have a phase between 240° and 360°. In some embodiments, each continuous wave may have a time duration of around 100 μs. A time gap between two adjacent continuous waves may be in a range from 1 to 2 ms.

In other embodiments, the cycle 310 may not have multiple continuous waves for each frequency. Rather, the cycle 310 has a single continuous wave for an individual frequency. For instance, the cycle 310 may include a first continuous wave for the frequency 317, and a second continuous wave for the frequency 327, and a third continuous wave for the frequency 337. The first, second, and third continuous waves may all start at 0°. There may be a time gap between two adjacent continuous waves of the first, second, and third continuous waves. The cycle 310 may produce image data for the controller 130 to generate a frame. The cycle 310 can be repeated for the controller 130 to generate more frames. The controller 130 may perform phase unwrapping to determine depth information.

Example Image Sensor

Figure 4:
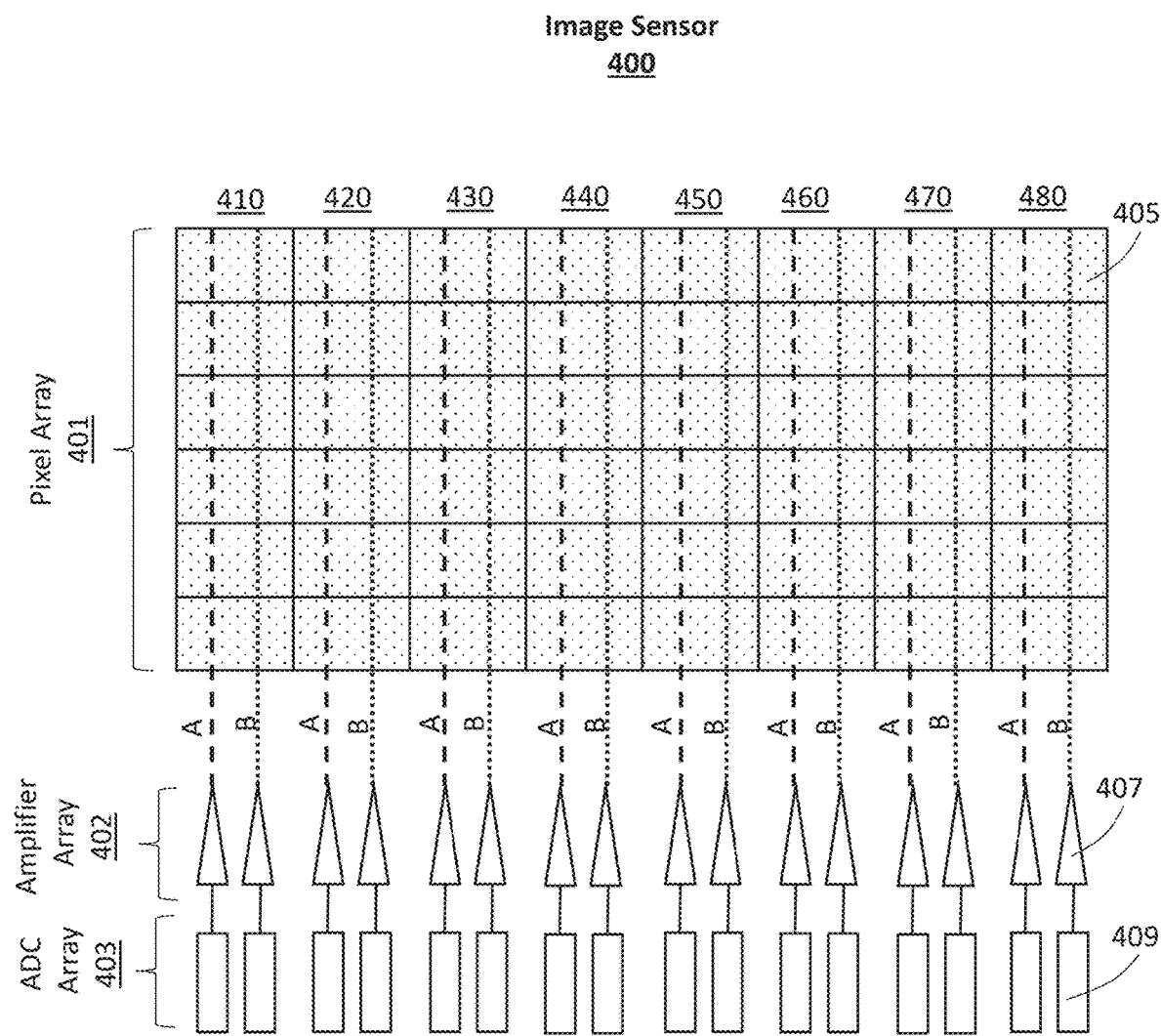
FIG. 4 illustrates an example image sensor according to some embodiments of the present disclosure.

FIG. 4 illustrates an example image sensor 400 according to some embodiments of the present disclosure. The image sensor 400 is configured to read out two signals from two readout ends, respectively, of an individual pixel. As the pixel provides two signals, the pixel is also referred to as a differential pixel. The image sensor 400 is an embodiment of the image sensor 120 in FIG. 1. As shown in FIG. 4, the image sensor 400 includes a pixel array 401 including a plurality of differential pixels 405 (individually referred to as "differential pixel 405"), an amplifier array 402 including a plurality of amplifiers 407 (individually referred to as "amplifier 407"), and an ADC array 403 including a plurality of ADC 409 (individually referred to as "ADC 409"). In alternative configurations, different and/or additional components may be included in the image sensor 400. For instance, the image sensor 400 may include a buffer array including a plurality of buffers in lieu of or in addition to the amplifier array 402. Further, functionality attributed to one component of the image sensor 400 may be accomplished by a different component included in image sensor 400 or a different system than those illustrated.

The pixel array 401 includes pixels arranged in eight columns 410, 420, 430, 440, 450, 460, 470, and 480. Each column includes six differential pixels 405 (individually referred to as "differential pixel 405"). In other embodiments, the pixel array 401 may include a different number of columns, or a column may include a different number of differential pixels 405. Each differential pixel 405 can receive photons and convert photons into electrical charges. The electrical charges may be stored in one or more storage regions in the differential pixel 405. Each differential pixel 405 can output two signals through two readout ends. The two ends are represented by "A" and "B" in FIG. 4. In the embodiment of FIG. 4, the differential pixels 405 in the same column share the same readout ends, and each column is associated with two readout ends.

Each column of the pixel array 401 corresponds to two adjacent amplifiers 407 in the amplifier array 402. The two adjacent amplifiers 407 are coupled to the two readout ends, respectively, of the column. Each amplifier 407 can amplify the analog signal from the corresponding readout end. Then the amplified analog signal is provided to an ADC 409 in the ADC array 403. The ADC 409 is coupled to the amplifier 407 and can convert the amplified analog signal into a digital signal. As shown in FIG. 4, each column of the pixel array 401 corresponds to two adjacent ADCs 409 in the ADC array 403, each of the two ADCs 409 corresponds to a different one of the two readout ends of the column. The image sensor 400 can read out two digital signals from each differential pixel 405.

By way of initial example, in FIG. 4 there are two single ended amplifiers 407 and two ADCs 409 per pixel column. In an alternative, the amplifiers may be omitted entirely, for example if the signal readout from the image sensor 400 is sufficiently large. In a further alternative, one single-ended ADC may be provided per pixel column (optionally with one or two single ended amplifiers), which may be multiplexed to convert both signals A and B. Providing one single ended ADC per column may reduce the size and cost of the depth estimation system, but also reduce readout speed.

Figure 5:
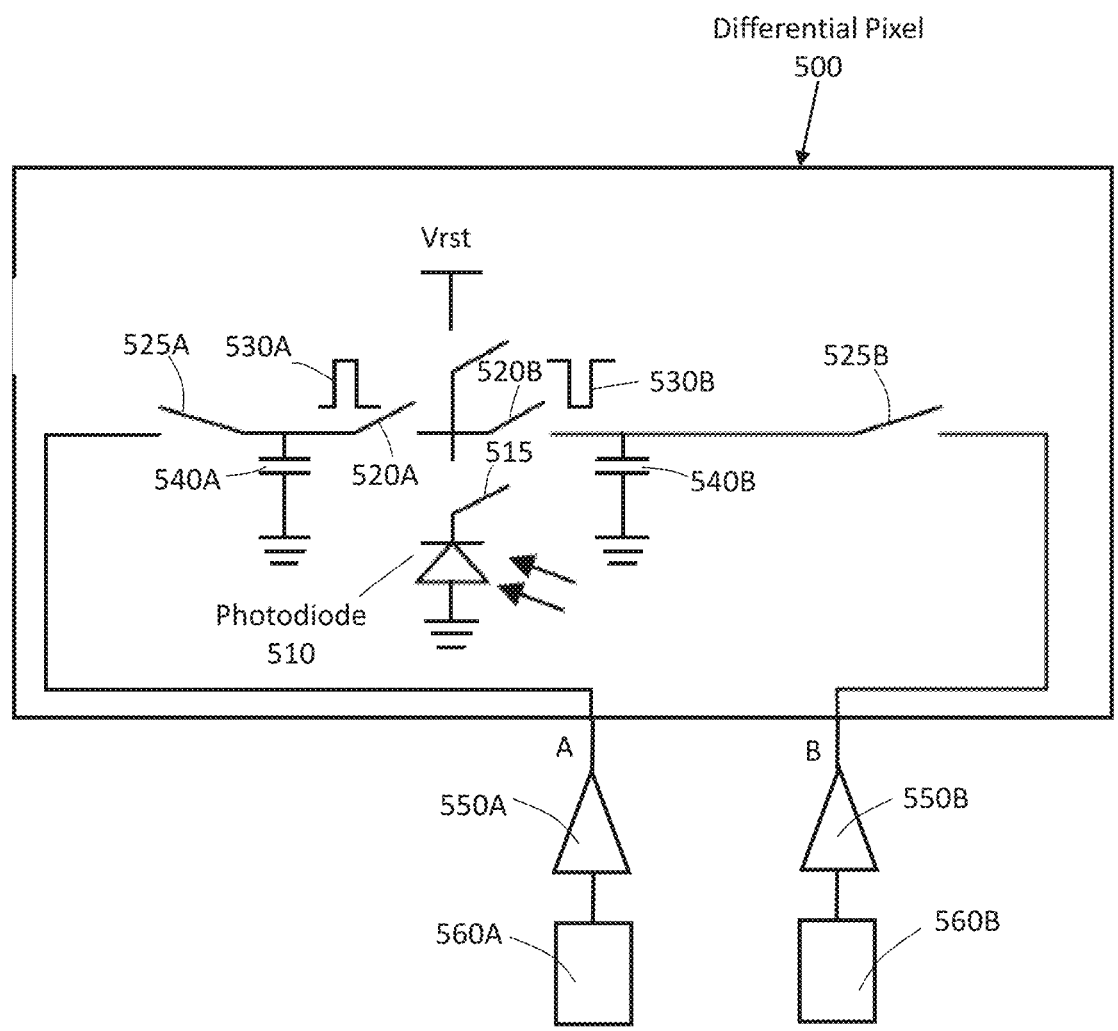
FIG. 5 illustrates an example pixel of the image sensor in FIG. 4 according to some embodiments of the present disclosure.

FIG. 5 illustrates an example differential pixel 500 according to some embodiments of the present disclosure. The differential pixel 500 may be an embodiment of a differential pixel 401 in FIG. 4. The differential pixel 500 includes a photodiode 510, switches 515, 520A, 525A, 520B, and 525B, clocks 530A and 530B, and capacitors 540A and 540B. In alternative configurations, different and/or additional components may be included in the differential pixel 500. Further, functionality attributed to one component of the image sensor 400 may be accomplished by a different component included in differential pixel 500 or a different system than those illustrated.

The photodiode 510 receives photons and convert photons into electrical charges. The photons may include photons of light projected by the illuminator assembly 110, photons of ambient light, or a combination of both. When the switches 515 and 520A are closed, the electrical charges can be stored in the capacitor 540A. The switch 520A is controlled by the clock 530A. When the switch 525A is closed, the charges stored in the capacitor 540A can be readout through the readout end A. Similarly, when the switches 515 and 520B are closed, the electrical charges can be stored in the capacitor 540B. The switch 520B is controlled by the clock 530B. When the switch 525B is closed, the charges stored in the capacitor 540B can be readout through the readout end B.

The readout end A is coupled to an amplifier 510A and an ADC 560A, through which the charges from the capacitor 540A can be amplified and converted into digital signals. The readout end B is coupled to an amplifier 510B and an ADC 560B, through which the charges from the capacitor 540B can be amplified and converted into digital signals.

The digital signals may be received and processed by other devices or components, e.g., the controller 130, to generate images, e.g., brightness images. In some embodiments, the controller 130 may include a memory for storing the digital signals. The digital signals from the two readout ends can be readout independently and computed digitally. The controller 130 may determine a sum of the two digital signals, i.e., A+B, and generate a common mode (CM) image. The CM image incorporates image data from ambient light reflected by the object. Alternatively or additionally, the controller 130 may determine a difference between the two digital signals (e.g., A−B) and cancel out ambient light from the signals. The image generated based on the difference between the two digital signals does not incorporate image data from ambient light.

Example Controller

Figure 6:
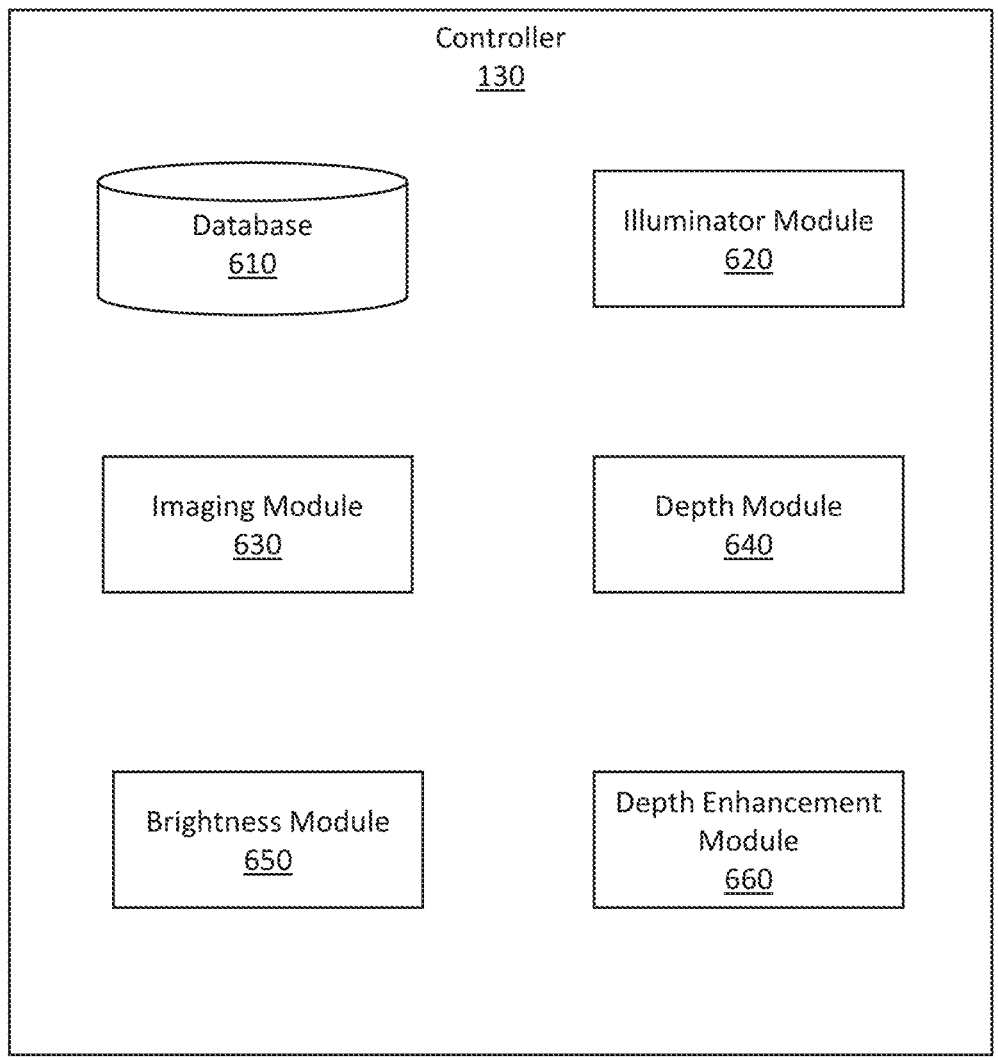
FIG. 6 is a block diagram illustrating a controller according to some embodiments of the present disclosure.

FIG. 6 is a block diagram illustrating the controller 130 according to some embodiments of the present disclosure. The controller 130 includes a database 610, an illuminator module 620, an imaging module 630, a depth module 640, a brightness module 650, and a depth enhancement module 660. These modules are software modules implemented on one or more processors, dedicated hardware units, or some combination thereof. Some embodiments of the controller 130 have different components than those described in conjunction with FIG. 6. Similarly, functions of the components described in conjunction with FIG. 6 may be distributed among other components in a different manner than described in conjunction with FIG. 6. For example, some or all of the functionality described as performed by the controller 130 may be performed by a device that incorporates a depth estimation system, such as the system 800 in FIG. 8, the mobile device 900 in FIG. 9, the entertainment system 1000 in FIG. 10, the robot 1100 in FIG. 11, or other devices.

The database 610 stores data generated and/or used by the controller 130. The database 610 is a memory, such as a ROM, DRAM, SRAM, or some combination thereof. The database 610 may be part of a larger digital memory of a depth estimation system, such as the depth estimation system 100, or a device that incorporates the depth estimation system. In some embodiments, the database 610 stores image data from the image sensor 120, depth images generated by the depth module 640, brightness images generated by the brightness module 650, enhanced depth images generated by the depth enhancement module 660, parameters for energy models generated by the depth enhancement module 660, parameters for optimizing energy models, and so on. In some embodiments, the database 610 may store calibration data and/or other data from other components, such as depth instructions. Depth instructions include illuminator instructions generated by the illuminator module 620 and imaging instructions generated by the imaging module 630.

The illuminator module 620 controls the illuminator assembly 110 via illuminator instructions. The illuminator instructions include one or more illumination parameters that control how light is projected by the illuminator assembly 110. An illumination parameter may describe, e.g., waveform, wavelength, amplitude, frequency, phase offset, starting time of each continuous wave, ending time of each continuous wave, duration of each continuous wave, some other parameter that controls how the light is projected by the illuminator assembly 110, or some combination thereof. The illuminator module 620 may retrieve the illuminator instructions from the database 350. Alternatively, the illuminator module 620 generates the illuminator instructions. For example, the illuminator module 620 determines the one or more illumination parameters. In embodiments where the illuminator assembly 110 include multiple modulated light projectors, the illuminator module 620 may determine separate illumination parameters for different light projectors.

The imaging module 630 controls the image sensor 120 via imaging instructions. The imaging module 630 may retrieve imaging instructions from the database 610. Alternatively, the imaging module 630 generates imaging instructions based in part on the illuminator instructions generated by the illuminator module 620. The imaging module 630 determines exposure parameters (such as starting time, ending time, or duration of an exposure interval, etc.) of the image sensor 120, e.g., based on one or more illumination parameters (such as duration of a continuous wave, etc.) specified in the illuminator instructions. For example, the imaging module 630 determines that the duration of an exposure equals the duration of a continuous wave. Sometimes the imaging module 630 determines that duration of an exposure is longer than the duration of a continuous wave to avoid failure to collect a whole continuous wave due to delay in incoming light. The duration of an exposure can be 20% longer than the duration of a continuous wave. In some embodiments, the imaging module 630 also determines a number of exposure intervals for each continuous wave of modulated light projected by the illumination assembly 110.

The imaging instruction may include readout instructions for controlling readouts of the image sensor 120. The imaging module 630 may determine readout parameters (such as starting time, ending time, or duration of a readout interval, etc.) of the image sensor 120. For example, the imaging module 630 determines a starting time for each of one or more readout intervals, e.g., based on one or more illumination parameters (such as phase, waveform, starting time, or other parameters of a continuous wave). The imaging module 630 may also determine a duration for each readout interval, the number of readout intervals for a continuous wave, time gap between adjacent readout intervals, the number of readout cycles, other readout parameters, or some combination thereof.

The depth module 640 is configured to generate depth images indicative of distance to the object 140 being imaged, e.g., based on digital signals indicative of charge accumulated on the pixel array 195. The depth module 640 may analyze the digital signals to determine a phase shift exhibited by the light (e.g., the phase shift φ described above in conjunction with FIG. 2) to determine a ToF (e.g., the ToF δ described above in conjunction with FIG. 2) of the light and further to determine a depth value (e.g., the distance d described above in conjunction with FIG. 2) of the object 140.

In embodiments where the illumination assembly 110 projects multiple continuous waves that have different phase offsets, the depth module 640 can generate a depth image through phase unwrapping. Taking the cycle 310 in FIG. 3 for example, the depth module 640 may determine wrapped distances, each of which corresponds to a respective phase. The depth module 640 can further estimate unwrapped depths for each of the wrapped distances. The depth module 640 further determines Voronoi vectors corresponding to the unwrapped depths and generate a lattice of Voronoi cells. Each unwrapped depth corresponds to a Voronoi cell of the lattice. In alternate embodiments, the depth module 640 is configured to determine depth information using a ratio of charge between the storage regions associated with each photodiode of the image sensor 120.

The brightness module 650 generates brightness images, such as active brightness images. In some embodiments, for a depth image generated by the depth module 640, the brightness module 650 generates a corresponding brightness image. The brightness module 650 may generate a brightness image in accordance with a request for the brightness image from the depth enhancement module 660. The depth module 640 may generate the depth image based on a phase shift between first captured light and projected light, versus the brightness module 650 may generate the corresponding brightness image based on the intensity or amplitude of second captured light. In some embodiments, the first captured light and the second capture light are same light. In other embodiments, the second captured light is different from the first captured light. For instance, the first captured light may be IR, versus the second captured light may be visible light.

In embodiments where the depth module 640 generates the depth image based on charges accumulated in the pixel array 195, the brightness module 650 may generate the corresponding brightness image based on charges accumulated in all or some of the pixels 197 in the set. The corresponding brightness image includes a plurality of brightness pixels. Each brightness pixel may correspond to a depth pixel in the depth image. For instance, the values of the depth pixel and corresponding brightness pixel may be both determined based on charges accumulated in a same pixel in the pixel array 195. The charges accumulated in the pixel may be converted from photons of modulated light reflected by a locus of the object 140. The value of the depth pixel may be determined by the depth module 640 based on a phase shift in the waveform of the modulated light. The value of the corresponding brightness pixel may be determined based on the accumulated charge in that pixel or a different pixel.

The depth enhancement module 660 enhances depth estimation made by the depth module 640 based on brightness images generated by the brightness module 650. The depth enhancement module 660 may retrieve a depth image generated by the depth module 640 and a corresponding brightness image generated by the brightness module 650. In some embodiments, the depth enhancement module 660 may instruct the brightness module 650 to generate the corresponding brightness image.

In some embodiments, the depth enhancement module 660 may use the brightness image to enhance one or more boundaries in the depth image. The brightness image may show one or more cleaner boundaries of the object 140 than the depth image. For instance, one or more depth pixels that represent at least a portion of a boundary of the object 140 may be invalid. The boundary may be an edge of the object 140. Alternatively, the boundary is a boundary between two areas of the object 140 that have different reflectivity properties, such as a boundary between a fluorescent strip, which has relatively high reflectivity, and a low reflectivity surface. An invalid depth pixel is a result of an invalid depth estimation, and a difference from the value of an invalid depth pixel and the ground-truth depth value may be beyond a threshold, such as 5%, 10%, or other percentages of the ground-truth depth value. The depth enhancement module 660 may take advantage of the more accurate information of the boundaries of the object 140 in the brightness image to generate an enhanced depth image, which includes better depth estimation than the original depth image.

The depth enhancement module 660 may fuse the depth image and the corresponding brightness image, e.g., through a filter. The filter may be a box filter, Gaussian filter, joint bilateral filter, guided filter, and so on. The depth enhancement module 660 may identify one or more invalid depth pixels in the depth image, e.g., by using a filter. In an embodiment, the depth enhancement module 660 identify one or more depth pixels on a boundary of the object 140, e.g., by using a filter, and consider the one or more depth pixels on a boundary as invalid pixels. A depth pixel on a boundary may be a depth pixel that represents a locus of the boundary. In another embodiment, the depth enhancement module 660 may compare the depth value of a pixel in the depth image with a depth value of the pixel determined by the guided filter and determine whether the pixel is invalid based on the comparison. For instance, in response to determining that a difference between the depth value in the depth image and the depth value from the guided filter is beyond a threshold (e.g., a threshold absolute value or a threshold percentage), the depth enhancement module 660 may determine that the pixel is invalid. In yet another embodiment, the depth enhancement module 660 may determine a noise level of a depth pixel and determine that the depth pixel is invalid in response to that the noise level is beyond a threshold.

The depth enhancement module 660 may determine a new depth value for an invalid depth pixel based on the brightness value of the corresponding brightness pixel in the brightness image. In an example, the new depth value is equal or similar to the brightness value. For a depth pixel that is not on any boundary, the depth enhancement module 660 may determine that the depth pixel is on a flat plan. The depth enhancement module 660 may not change the depth value of the depth pixel, or the depth enhancement module 660 may determine an average of depth values of depth pixels in a box centered at the depth pixel and use the average as the new depth value of the depth pixel.

The depth enhancement module 660 may generate an enhanced depth image with the new depth values. For instance, the depth enhancement module 660 may replace the value of a depth pixel with the new depth value. The enhanced depth image represents better depth estimation, especially for one or more boundaries of the object 140.

Example Depth Estimation Enhancement

Figure 7A:
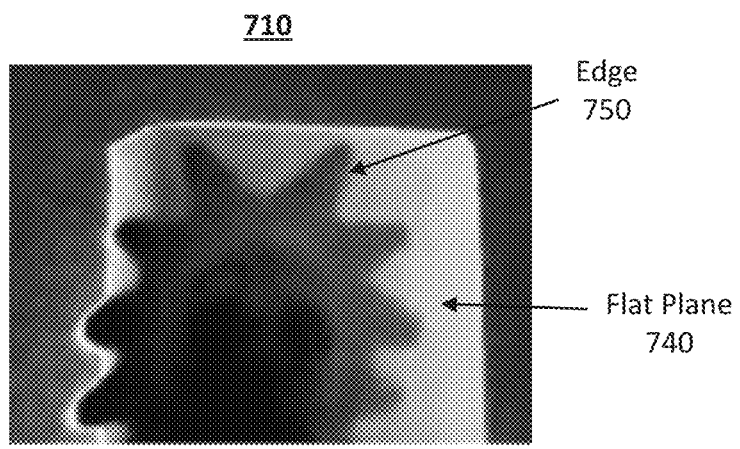
FIG. 7A illustrates an example depth image according to some embodiments of the present disclosure.
Figure 7B:
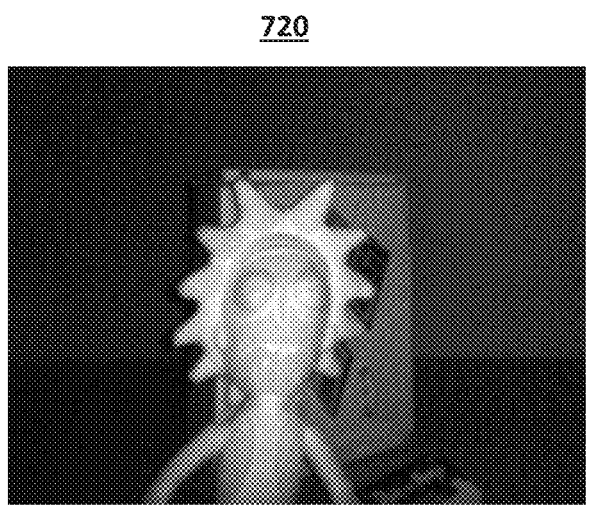
FIG. 7B illustrates an example brightness image corresponding to the depth image in FIG. 5A according to some embodiments of the present disclosure.
Figure 7C:
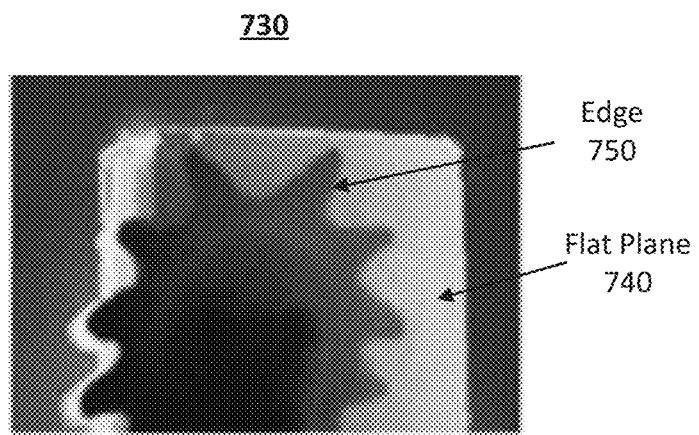
FIG. 7C illustrates an example depth enhanced image generated from the depth image in FIG. 5A and the brightness image in FIG. 5B according to some embodiments of the present disclosure.

FIG. 7A illustrates an example depth image 710 according to some embodiments of the present disclosure. The depth image 710 may be generated by the depth module 640 described above in conjunction with FIG. 4. FIG. 7B illustrates an example brightness image 720 corresponding to the depth image 710 in FIG. 7A according to some embodiments of the present disclosure. The brightness image 720 may be generated by the brightness module 650 described above in conjunction with FIG. 4. FIG. 7C illustrates an example depth enhanced image 730 generated from the depth image 710 in FIG. 7A and the brightness image 720 in FIG. 7B according to some embodiments of the present disclosure.

The three images 710, 720, and 730 captures an object, an example of which is the object 140 in FIG. 1. The object has a flat plane 740 and an edge 750. A part of the edge is enclosed in the dashed oval shapes in FIGS. 7A-5C. As shown in FIGS. 7A and 7B, the brightness image 720 shows a cleaner edge than the depth image 710. Thus, the brightness image 720 can be used to enhance depth estimation of the object, particularly the edge 750 of the object. The brightness image 720 is fused with the depth image 710 through an energy model to generate the depth enhanced image 730. The depth enhanced image 730 shows better depth estimation than the depth image 710. As shown in FIGS. 7A and 7C, the edge in the depth enhanced image 730 is cleaner than the depth image 710. The depth enhanced image 730 may be generated by using an energy model, for which the depth image 710 may be used an input image and the brightness image 720 may be used a guidance image. The depth enhanced image 730 may be generated by the depth enhancement process described above in conjunction with the depth enhancement module 660. For instance, the pixels representing the edge 750 are identified and new depth values for the pixels are determined based on the values of the pixels in the brightness image 720. The new depth values of the pixels are used to generate the depth enhanced image 730.

FIGS. 7A and 7C also show that the flat plane 740 is smoother in the depth enhanced image 730. In some embodiments of FIGS. 7A-5C, pixels representing the flat plane 740 are also identified. For each of these pixels, a box is defined. The box may be centered at the pixel and include other pixels that surround the pixel. A new depth value of the pixel is determined based on depth values of the other pixels in the box. For instance, the new depth value of the pixel may be an average of the depth values of the other pixels. The new depth values of the pixels are used to generate the depth enhanced image 730. Through such a depth enhancement process, the depth enhanced image 730 represents more accurate depth estimation of the object, such as more accurate depth estimation of the flat plane 740, the edge 750, or both.

Example Applications Incorporating Depth Estimation System

Figure 8:
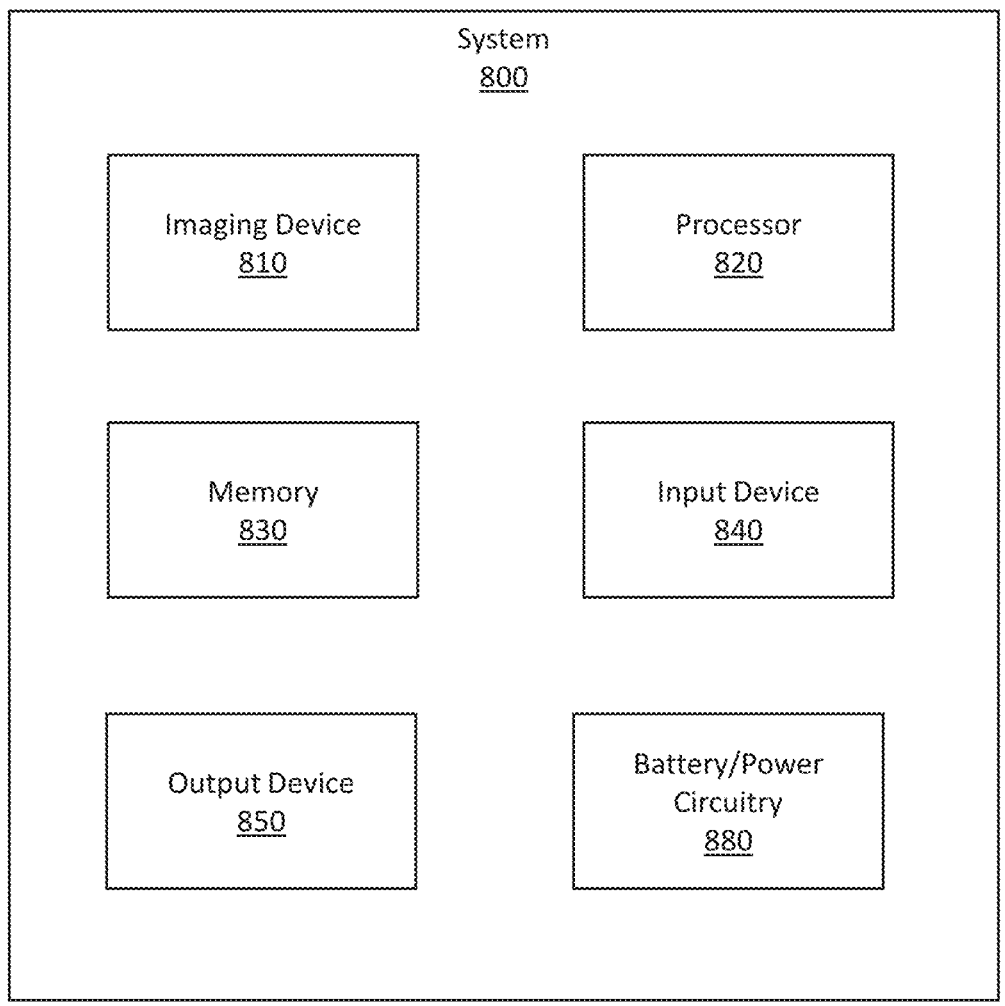
FIG. 8 illustrates an example system incorporating a depth estimation system according to some embodiments of the present disclosure.

FIG. 8 illustrates an example system 800 incorporating a depth estimation system according to some embodiments of the present disclosure. An embodiment of the depth estimation system is the depth estimation system 100 in FIG. 1. The system 800 includes an imaging device 810, a processor 820, a memory 830, an input device 840, an output device 850, and a battery/power circuitry 860. In other embodiments, the system 800 may include fewer, more, or different components. For instance, the system 800 may include multiple processors, memories, display devices, input devices, or output devices.

The imaging device 810 captures depth images and brightness images. The imaging device 810 may include an illuminator assembly, such as the illuminator assembly 110, for projecting light into an environment surrounding the system 800. The imaging device 810 can project modulated light, such as pulsed modulated light or continuous waves of modulated light. The imaging device 810 also includes an image sensor, such as the image sensor 120, that captures light reflected by one or more objects in the environment and generates image data of the one or more objects.

The processor 820 can process electronic data from registers and/or memory to transform that electronic data into other electronic data that may be stored in registers and/or memory. The processor 820 may perform some or all functions of some or all components of the controller 130, such as depth estimation, enhancing depth estimation with brightness signa, and so on. The processor 820 may include one or more digital signal processors (DSPs), application-specific integrated circuits (ASICs), CPUs, GPUs, cryptoprocessors (specialized processors that execute cryptographic algorithms within hardware), server processors, or any other suitable processing devices.

In some embodiments, the processor 820 may also use depth information (e.g., enhanced depth images) to generate content (e.g., images, audio, etc.) for display to a user of the system by one or more display devices, such as the output device 850. The content may be used as VR, AR, or MR content. The processor 820 may also generate instructions for other components of the system 800 or another system based on enhanced depth images. For instance, the processor 820 may determine a navigation instruction for a movable device, such as a robot, a vehicle, or other types of movable devices. The navigation instruction may include navigation parameters (e.g., navigation routes, speed, orientation, and so on).

The memory 830 may include one or more memory devices such as volatile memory (e.g., DRAM), nonvolatile memory (e.g., read-only memory (ROM)), flash memory, solid state memory, and/or a hard drive. In some embodiments, the memory 830 may include memory that shares a die with the processor 820. The memory 830 may store processor-executable instructions for controlling operation of the depth estimation system 100, and/or data captured by the depth estimation system 100. In some embodiments, the memory 830 includes one or more non-transitory computer-readable media storing instructions executable to perform depth estimation enhancement processes, e.g., the method 1200 described below in conjunction with FIG. 10, or the operations performed by the controller 130 (or some of the components of the controller 130) described above in conjunction with FIG. 1 and FIG. 4. The instructions stored in the one or more non-transitory computer-readable media may be executed by the processor 820.

The input device 840 may include an audio input device. The audio input device 1318 may include any device that generates a signal representative of a sound, such as microphones, microphone arrays, digital instruments (e.g., instruments having a musical instrument digital interface (MIDI) output), and so on. The input device 840 may also include one or more other types of input devices, such as accelerometer, gyroscope, compass, image capture device, keyboard, cursor control device (such as a mouse), stylus, touchpad, bar code reader, Quick Response (QR) code reader, sensor, radio-frequency identification (RFID) reader, and so on.

The output device 850 may include one or more display devices, such as one or more visual indicators. Example visual indicators include heads-up display, computer monitor, projector, touchscreen display, liquid crystal display (LCD), light-emitting diode display, or flat panel display, and so on. The output device 850 may also include an audio output device. The audio output device may include any device that generates an audible indicator, such as speakers, headsets, or earbuds, and so on. The output device 850 may also include one or more other output devices, such as audio codec, video codec, printer, wired or wireless transmitter for providing information to other devices, and so on.

The battery/power circuitry 860 may include one or more energy storage devices (e.g., batteries or capacitors) and/or circuitry for coupling components of the system 800 to an energy source separate from the system 800 (e.g., AC line power).

Figure 9:
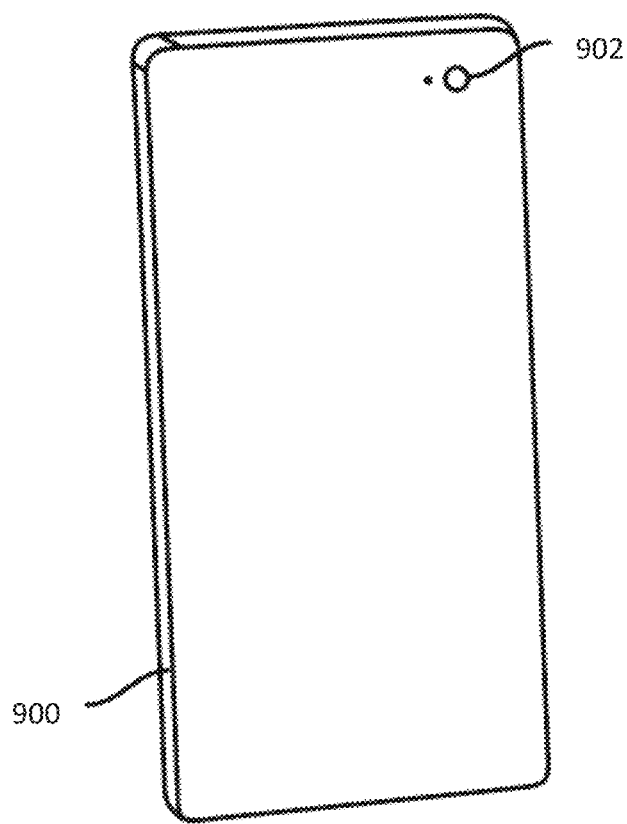
FIG. 9 illustrates a mobile device incorporating a depth estimation system according to some embodiments of the present disclosure.

FIG. 9 illustrates a mobile device 900 incorporating a depth estimation system according to some embodiments of the present disclosure. An example of the depth estimation system is the depth estimation system 100 in FIG. 1. The mobile device 900 may be a mobile phone. As shown in FIG. 9, the mobile device 900 includes an imaging assembly 902. The imaging device may include the illuminator assembly 110 and the image sensor 120 in FIG. 1. The imaging assembly 902 may illuminate the environment surrounding the mobile device 900 with modulated light (e.g., modulated IR) and capture images of one or more objects in the environment. Even though not shown in FIG. 9, the mobile device 900 may include one or more processors and one or more memories that can perform some or all of the functions of the controller 130. With these components, the mobile device 900 may determine depth information of one or more objects in an environment surrounding the mobile device 900. The depth information can be used, by the mobile device 900, another device, or a user of the mobile device, for various purposes, such as VR, AR, or MR applications, navigation applications, and so on. For instance, the mobile device 900 may generate and present images (two-dimensional or three-dimensional images) based on the depth information of the environment, and the images may represent virtual objects that do not exist in the real-world environment. The images may augment the real-world objects in the environment so that a user of the mobile device 900 may have an interactive experience of the real-world environment where the real-world objects that reside in the real world are enhanced by computer-generated virtual objects.

Figure 10:
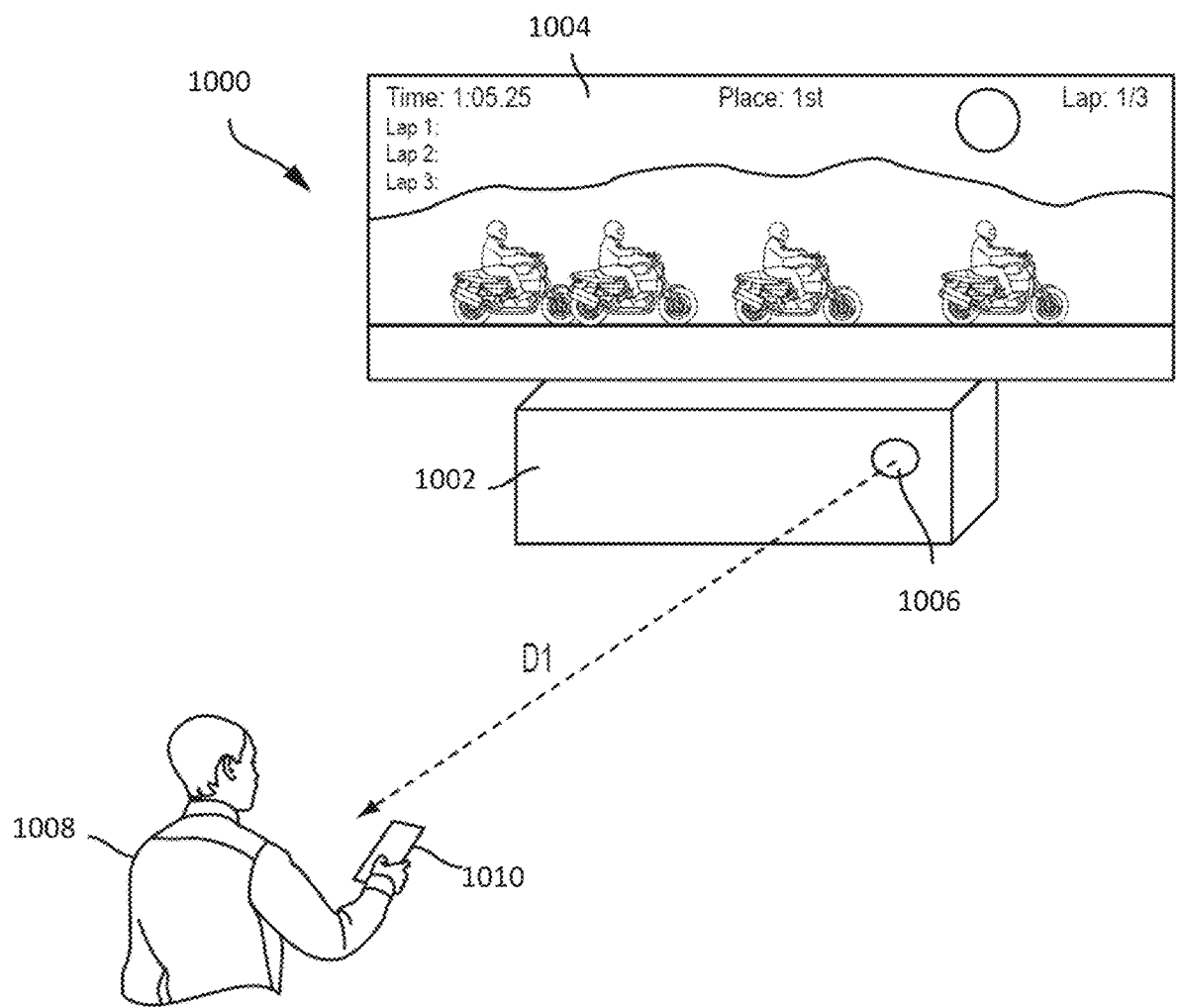
FIG. 10 illustrates an entertainment system incorporating a depth estimation system according to some embodiments of the present disclosure.

FIG. 10 illustrates an entertainment system 1000 incorporating a depth estimation system according to some embodiments of the present disclosure. In the example of FIG. 10, a user 1008 may interact with the entertainment system via a controller 1010, for example to play a video game. The entertainment system 1000 includes a console 1002 and display 1004. The console 1002 may be a video gaming console configured to generate images of a video game on the display 1004. In other embodiments, the entertainment system 1000 may include more, fewer, or different components.

The console 1002 includes an imaging assembly 1006. The imaging assembly 1006 may include the illuminator assembly 110 and the image sensor 120 in FIG. 1. The imaging assembly 1006 may illuminate the environment surrounding the entertainment system 1000 with modulated light (e.g., modulated IR) and capture modulated light reflected by one or more objects in the environment to generate images of the objects, such as the user 1008, controller 1010, or other objects. Even though not shown in FIG. 10, the console 1002 may include one or more processors and one or more memories that can perform some or all of the functions of the controller 130. The console 1002 may determine depth information of one or more objects in the environment. The depth information may be used to present images to the user on the display 1004 or for control of some other aspect of the entertainment system 1000. For example, the user 1008 may control the entertainment system 1000 with hand gestures, and the gestures may be determined at least in part through the depth information. The console 1002 may generate or update display content (e.g., images, audio, etc.) based on the depth information and may also instruct the display 1004 to present the display content to the user 1008.

Figure 11:
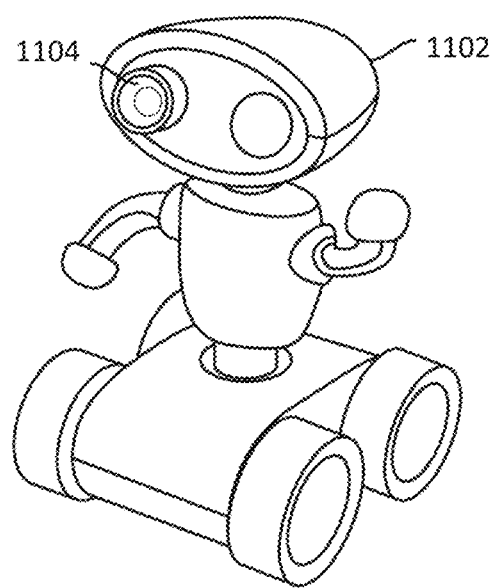
FIG. 11 illustrates an example robot incorporating a depth estimation system according to some embodiments of the present disclosure.

FIG. 11 illustrates an example robot 1102 incorporating a depth estimation system according to some embodiments of the present disclosure. The robot 1102 includes an imaging assembly 1104 that may include the illuminator assembly 110 and the image sensor 120 in FIG. 1. The imaging assembly 1104 may illuminate the environment surrounding the robot 1102 with modulated light (e.g., modulated IR) and capture images of one or more objects in the environment. Even though not shown in FIG. 11, the robot 1102 may include a computing device that can perform some or all of the functions of the controller 130. The computing device may include one or more processors and one or more memories. The computing device may determine depth information of one or more objects in the environment. The robot 1102 may be mobile and the computing device may use the depth information to assist in navigation and/or motor control of the robot 1102. For instance, the computing device may include a navigation instruction based on the depth information. The navigation instruction may include a navigation route of the robot 1102. The robot 1102 may navigate in the environment in accordance with the navigation instruction.

Examples of uses of the technology described herein beyond those shown in FIGS. 7-9 are also possible. For example, the depth estimation system described herein may be used in other applications, such as autonomous vehicles, security cameras, and so on.

Example Method of Using Energy Model to Enhance Depth Estimation

FIG. 12 is a flowchart showing a method 1200 of using an energy model to enhance depth estimation with a brightness image, according to some embodiments of the present disclosure. The method 1200 may be performed by the controller 130. Although the method 1200 is described with reference to the flowchart illustrated in FIG. 12, many other methods of using an energy model to enhance depth estimation with a brightness image may alternatively be used. For example, the order of execution of the steps in FIG. 12 may be changed. As another example, some of the steps may be changed, eliminated, or combined.

The controller 130 generates 1210 a brightness image based on image data from an image sensor. The image sensor includes a plurality of pixels that may be arranged in columns. The brightness image includes a plurality of brightness pixels. Each of the plurality of brightness pixels corresponds to a respective pixel of the plurality of pixels and is generated based on signals from two ADCs associated with the respective pixel. Each of the two ADCs is to convert a different analog signal from the respective pixel to a different digital signal in the image data. The two ADCs are associated with one or more other pixels of the plurality of pixels. The one or more other pixels and the respective pixel may be arranged in a same column in the image sensor.

The controller 130 also generates 1220 the depth image based on the image data. The depth image includes a plurality of depth pixels. Each depth pixel is associated with a depth value. The brightness image and the depth image may capture a same object. The target depth pixel may represent a same locus of an object as the brightness pixel.

The controller 130 determines 1230 a new depth value for a target depth pixel of the plurality of depth pixels based on a brightness pixel of the plurality of brightness pixels. The target depth pixel and the brightness pixel may correspond to a same pixel of the plurality of pixels. The controller 130 updates 1240 the depth image by assigning the new depth value to the target depth pixel.

In some embodiments, the controller 130 instructs an illuminator assembly to project modulated light into a local area including an object. The modulated light includes continuous waves of infrared, and the continuous waves have different frequencies. The controller 130 also instructs the image sensor to capture reflected light from at least a portion of the object. The controller 130 generates the depth image based on a phase shift between the reflected light and the modulated light projected into the local area. In some embodiments, the controller 130 may generate the brightness image based on brightness of the reflected light. In other embodiments, the reflected light is first reflected light, and the controller 130 instructs the image sensor to capture second reflected light from at least the portion of the object.

Variations and Implementations

While embodiments of the present disclosure were described above with references to exemplary implementations as shown in FIGS. 1-10, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as filters, converters, mixers, amplifiers, digital logic circuitries, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to fractional frequency dividers, in various communication systems.

Parts of various systems for implementing duty cycle-regulated, balanced fractional frequency divider as proposed herein can include electronic circuitry to perform the functions described herein. In some cases, one or more parts of the system can be provided by a processor specially configured for carrying out the functions described herein. For instance, the processor may include one or more application-specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application-specific hardware of electronic devices. Note that particular embodiments of the present disclosure may be readily included in a system on chip (SOC) package, either in part, or in whole. An SOC represents an integrated circuit that integrates components of a computer or other electronic system into a single chip. It may contain digital, analog, mixed-signal, and often radio-frequency (RF) functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

Select Examples

Example 1 provides a method, including: generating, based on image data from an image sensor including a plurality of pixels, a brightness image including a plurality of brightness pixels, where each of the plurality of brightness pixels corresponds to a respective pixel of the plurality of pixels and is generated based on signals from two ADCs associated with the respective pixel; generating, based on the image data, a depth image including a plurality of depth pixels, each depth pixel associated with a depth value; determining a new depth value for a target depth pixel of the plurality of depth pixels based on a brightness pixel of the plurality of brightness pixels; and updating the depth image by assigning the new depth value to the target depth pixel.

Example 2 provides the method of example 1, where the target depth pixel and the brightness pixel correspond to a same pixel of the plurality of pixels.

Example 3 provides the method of example 1 or 2, where each of the two ADCs is to convert a different analog signal from the respective pixel to a different digital signal in the image data.

Example 4 provides the method of any of the preceding example, where the two ADCs are associated with one or more other pixels of the plurality of pixels.

Example 5 provides the method of example 4, where the one or more other pixels and the respective pixel are arranged in a same column in the image sensor.

Example 6 provides the method of any of the preceding example, where: the brightness image and the depth image capture a same object, and the target depth pixel represents a same locus of an object as the brightness pixel.

Example 7 provides the method of any of the preceding example, further including: instructing an illuminator assembly to project modulated light into a local area including an object; instructing the image sensor to capture reflected light from at least a portion of the object; and generating the depth image based on a phase shift between the reflected light and the modulated light projected into the local area.

Example 8 provides the method of example 7, where the modulated light includes continuous waves of infrared, and the continuous waves have different frequencies.

Example 9 provides the method of example 7 or 8, further including: generating the brightness image based on brightness of the reflected light.

Example 10 provides the method of any one of examples 7-9, where the reflected light is first reflected light, and the method further includes: instructing the image sensor to capture second reflected light from at least the portion of the object; and generating the brightness image based on brightness of the second reflected light, where the second reflected light has a different wavelength from the first reflected light.

Example 11 provides a system, including: an illuminator assembly configured to project modulated light into a local area including an object; an image sensor including a plurality of pixels, the image sensor configured to: capture reflected light from at least a portion of the object, and generate image data from the reflected light; and a controller configured to: generate, based on the image data, a brightness image including a plurality of brightness pixels, where each of the plurality of brightness pixels corresponds to a respective pixel of the plurality of pixels and is generated based on signals from two ADCs associated with the respective pixel; generate, based on the image data, a depth image including a plurality of depth pixels, each depth pixel associated with a depth value; determine a new depth value for a target depth pixel of the plurality of depth pixels based on a brightness pixel of the plurality of brightness pixels; and update the depth image by assigning the new depth value to the target depth pixel.

Example 12 provides the system of example 11, where the target depth pixel and the brightness pixel correspond to a same pixel of the plurality of pixels.

Example 13 provides the system of example 11 or 12, where each of the two ADCs is to convert a different analog signal from the respective pixel to a different digital signal in the image data.

Example 14 provides the system of any one of examples 11-13, where the two ADCs are associated with one or more other pixels of the plurality of pixels.

Example 15 provides the system of example 14, where the one or more other pixels and the respective pixel are arranged in a same column in the image sensor.

Example 16 provides one or more non-transitory computer-readable media storing instructions executable to perform operations, the operations including: generating, based on image data from an image sensor including a plurality of pixels, a brightness image including a plurality of brightness pixels, where each of the plurality of brightness pixels corresponds to a respective pixel of the plurality of pixels and is generated based on signals from two ADCs associated with the respective pixel; generating, based on the image data, a depth image including a plurality of depth pixels, each depth pixel associated with a depth value; determining a new depth value for a target depth pixel of the plurality of depth pixels based on a brightness pixel of the plurality of brightness pixels; and updating the depth image by assigning the new depth value to the target depth pixel.

Example 17 provides the one or more non-transitory computer-readable media of example 16, where the target depth pixel and the brightness pixel correspond to a same pixel of the plurality of pixels.

Example 18 provides the one or more non-transitory computer-readable media of example 16 or 17, where each of the two ADCs is to convert a different analog signal from the respective pixel to a different digital signal in the image data.

Example 19 provides the one or more non-transitory computer-readable media of any one of examples 16-18, where the two ADCs are associated with one or more other pixels of the plurality of pixels.

Example 20 provides the one or more non-transitory computer-readable media of example 19, where the one or more other pixels and the respective pixel are arranged in a same column in the image sensor.

The invention claimed is:

1. A method, comprising:
generating, based on image data from an image sensor comprising a plurality of pixel devices, a brightness image comprising a plurality of brightness pixels, wherein each of the plurality of brightness pixels corresponds to a respective pixel device of the plurality of pixel devices and has a value that is generated based on signals from at least one analog-to-digital converter (ADC) associated with the respective pixel device;
generating, based on the image data, a depth image comprising a plurality of depth pixels, each depth pixel associated with a depth value;
determining a new depth value for a target depth pixel of the plurality of depth pixels based on a brightness pixel of the plurality of brightness pixels; and
updating the depth image by assigning the new depth value to the target depth pixel.

2. The method of claim 1, wherein the target depth pixel and the brightness pixel correspond to a same pixel device of the plurality of pixel devices.

3. The method of claim 1, the at least one ADC including two ADCs, wherein a first ADC of the two ADCs is to convert a first analog signal from the respective pixel device to a first digital signal in the image data, and wherein a second ADC of the two ADCs is to convert a second analog signal from the respective pixel device to a second digital signal in the image data.

4. The method of claim 1, the at least one ADC being further associated with one or more other pixel devices of the plurality of pixel devices.

5. The method of claim 4, wherein the one or more other pixel devices and the respective pixel device are arranged in a same column in the image sensor.

6. The method of claim 1, wherein:
the brightness image is representative of an object,
the depth image is representative of the object,
the target depth pixel corresponds to a locus of the object, and
the brightness pixel corresponds to the locus of the object.

7. The method of claim 1, further comprising:
instructing an illuminator assembly to project modulated light into a local area including an object;
instructing the image sensor to capture reflected light from at least a portion of the object; and
generating the depth image based on a phase shift between the reflected light and the modulated light projected into the local area.

8. The method of claim 7, wherein the modulated light includes continuous waves of infrared light, and the continuous waves having different modulation frequencies.

9. The method of claim 7, further comprising:
generating the brightness image based on brightness of the reflected light.

10. The method of claim 7, further comprising:
instructing the image sensor to capture second reflected light from at least the portion of the object; and
generating the brightness image based on brightness of the second reflected light,
wherein the second reflected light has a different wavelength from the reflected light.

11. A system, comprising:
an image sensor comprising a plurality of pixel devices, the image sensor configured to:
capture reflected light from at least a portion of the object, and
generate, using the reflected light, image data; and
a controller configured to:
generate, based on the image data, a brightness image comprising a plurality of brightness pixels, wherein each of the plurality of brightness pixels corresponds to a respective pixel device of the plurality of pixel devices and has a value that is generated based on signals from at least one analog-to-digital converter (ADC) associated with the respective pixel device;
generate, based on the image data, a depth image comprising a plurality of depth pixels, each depth pixel associated with a depth value;
determine a new depth value for a target depth pixel of the plurality of depth pixels based on a brightness pixel of the plurality of brightness pixels; and
update the depth image by assigning the new depth value to the target depth pixel.

12. The system of claim 11, wherein the target depth pixel and the brightness pixel correspond to a same pixel device of the plurality of pixel devices.

13. The system of claim 11, the at least one ADC including two ADCs, wherein a first ADC of the two ADCs is to convert a first analog signal from the respective pixel device to a first digital signal in the image data, and wherein a second ADC of the two ADCs is to convert a second analog signal from the respective pixel device to a second digital signal in the image data.

14. The system of claim 11, the at least one ADC being further associated with one or more other pixel devices of the plurality of pixel devices.

15. The system of claim 14, wherein the one or more other pixel devices and the respective pixel device are arranged in a same column in the image sensor.

16. One or more non-transitory computer-readable media storing instructions executable to perform operations, the operations comprising:
generating, based on image data from an image sensor comprising a plurality of pixel devices, a brightness image comprising a plurality of brightness pixels, wherein each of the plurality of brightness pixels corresponds to a respective pixel device of the plurality of pixel devices and has a value that is generated based on signals from at least one analog-to-digital converter (ADC) associated with the respective pixel device;
generating, based on the image data, a depth image comprising a plurality of depth pixels, each depth pixel associated with a depth value;
determining a new depth value for a target depth pixel of the plurality of depth pixels based on a brightness pixel of the plurality of brightness pixels; and
updating the depth image by assigning the new depth value to the target depth pixel.

17. The one or more non-transitory computer-readable media of claim 16, wherein the target depth pixel and the brightness pixel correspond to a same pixel device of the plurality of pixel devices.

18. The one or more non-transitory computer-readable media of claim 16, the at least one ADC including two ADCs, wherein a first ADC of the two ADCs is to convert a analog signal from the respective pixel device to a first digital signal in the image data, and wherein a second ADC of the two ADCs is to convert a second analog signal from the respective pixel device to a second digital signal in the image data.

19. The one or more non-transitory computer-readable media of claim 16, the at least one ADC being further associated with one or more other pixel devices of the plurality of pixel devices.

20. The one or more non-transitory computer-readable media of claim 19, wherein the one or more other pixel devices and the respective pixel device are arranged in a same column in the image sensor.

\* \* \* \* \*